US 9,300,751 B2

(12) United States Patent
Luxenberg et al.

(10) Patent No.: US 9,300,751 B2
(45) Date of Patent: *Mar. 29, 2016

(54) MANAGING A DISTRIBUTED CACHE FOR VIRTUAL MACHINES

(71) Applicant: Red Hat Israel, Ltd., Raanana (IL)

(72) Inventors: Roni Luxenberg, Raanana (IL); Uri Lublin, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,003

(22) Filed: Feb. 2, 2015

(65) Prior Publication Data

US 2015/0156272 A1 Jun. 4, 2015

Related U.S. Application Data

(63) Continuation of application No. 13/691,211, filed on Nov. 30, 2012, now Pat. No. 8,949,320.

(51) Int. Cl.
| | |
|---|---|
| H04L 29/08 | (2006.01) |
| G06F 9/455 | (2006.01) |
| G06F 9/44 | (2006.01) |
| G06F 15/167 | (2006.01) |
| H04L 29/06 | (2006.01) |

(52) U.S. Cl.
CPC .......... *H04L 67/2842* (2013.01); *G06F 9/4443* (2013.01); *G06F 9/45533* (2013.01); *G06F 15/167* (2013.01); *H04L 67/288* (2013.01); *H04L 63/083* (2013.01)

(58) Field of Classification Search
CPC .................................................. H04L 67/2842
USPC .......................... 709/203, 217, 219, 223, 224
See application file for complete search history.

(56) References Cited

U.S. PATENT DOCUMENTS

| | | | | | |
|---|---|---|---|---|---|
| 5,692,143 | A | * | 11/1997 | Johnson et al. | 715/764 |
| 6,118,428 | A | * | 9/2000 | Blackmon et al. | 715/209 |
| 7,243,336 | B2 | * | 7/2007 | Brockway et al. | 717/120 |
| 2002/0133570 | A1 | | 9/2002 | Michel | |
| 2003/0149843 | A1 | * | 8/2003 | Jarvis et al. | 711/133 |
| 2005/0131900 | A1 | | 6/2005 | Palliyll et al. | |
| 2007/0156852 | A1 | * | 7/2007 | Sundarrajan et al. | 709/219 |
| 2007/0214423 | A1 | * | 9/2007 | Teplov et al. | 715/751 |
| 2009/0307428 | A1 | * | 12/2009 | Schmieder et al. | 711/118 |
| 2011/0265083 | A1 | * | 10/2011 | Davis | 718/1 |
| 2012/0084381 | A1 | * | 4/2012 | Alladi et al. | 709/213 |
| 2013/0132472 | A1 | * | 5/2013 | Sundarrajan et al. | 709/203 |
| 2014/0189035 | A1 | * | 7/2014 | Chen et al. | 709/213 |

* cited by examiner

*Primary Examiner* — Lashonda Jacobs
(74) *Attorney, Agent, or Firm* — Lowenstein Sandler LLP (57) ABSTRACT

A processing device of host may receive desktop image data for a first client device that includes a graphical object. The processing device may determine an object identifier of the graphical object and a device identifier of a second client device associated with the graphical object. The processing device may provide the object identifier and the device identifier to the first client device.

20 Claims, 6 Drawing Sheets

MANAGING A DISTRIBUTED CACHE FOR VIRTUAL MACHINES

CROSS REFERENCE TO RELATED APPLICATION

This application is a continuation of issued U.S. patent application Ser. No. 13/691,211 U.S. Pat. No. 8,949,320, filed Nov. 30, 2012, and hereby incorporated by reference in its entirety.

TECHNICAL FIELD

This disclosure relates to the field of virtual machines and, in particular, to managing a distributed cache of graphical objects used by clients that access the virtual machines.

BACKGROUND

A virtual machine (VM) may be a software implementation of a physical machine (computer) that includes its own operating system (referred to as a guest operating system) and executes application programs. A host computer allocates a certain amount of its resources to each of the virtual machines, and multiplexes its underlying hardware platform among the virtual machines. Each virtual machine is then able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer. A host controller (e.g., a server) may manage (e.g., create/remove one or more virtual machines, shut down one or more virtual machines), monitor (e.g., monitor system resources used by hosts and/or virtual machines), configure (e.g., change hardware, software and/or guest operating systems on one or more virtual machines), and/or control the virtual machines.

Client devices (e.g., computing devices such as laptop computers, desktop computers, smart phones, tablet computers) may access the virtual machines. Each virtual machine may provide a virtual computing device for a client device. From the user's point of view, the virtual computing device may function as a physical computing device (e.g., a personal computer) and is indistinguishable from a physical computing device. The client devices may use a VM client to communicate, access, and/or use the different VMs. The VM client may provide a desktop environment (e.g., a virtual desktop environment) that may allow the user to use, access, and/or manage a VM. The desktop environment may be a graphical user interface that includes various graphical objects such as images, icons, graphics, text, background images, background colors, menus, graphical user interface elements (e.g., buttons, text fields, drop-down menus, etc.), bitmaps, regions, lines, splines, fonts, graphics, and/or other objects. Graphical objects may also be used to construct other graphical objects. For example, text, a background color, and an image may be used to construct an image of a button and the image of the button may be a graphical object.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Clients may access VMs using a remote access protocol (e.g., Virtual Network Computing (VNC), Remote Desktop Protocol (RDP), Simple Protocol for Independent Computing Environments (SPICE), etc.). The remote access protocol provides client access to a remote machine display and devices (e.g., keyboard, mouse, audio) and may provide a desktop environment to allow the user to experience a similar interaction as with a local machine. The client may use desktop image data to display or provide the desktop environment. The desktop image data may be any data or information that is used by a client to display or render a desktop environment. For example, the desktop image data may include locations (e.g., X-Y coordinates) for graphical objects), a list of graphical objects that are used, a resolution for the desktop environment (e.g., height and width in pixels), etc. The desktop image data may include and/or use graphical objects, such as graphics, icons, images, text, colors, etc. Each client may maintain a cache of graphical objects that it has received from a service that is running, executing, and/or operating the VM.

A cache manager may be included in each service that is executing and/or operating a VM and the cache manager may track and/or manage which graphical objects have been provided to which clients. The cache manager may manage and/or track the caches distributed across multiple clients (e.g., may manage a distributed cache). Based on this information about which clients have which graphical objects in their cache, the service may instruct a first client to access a graphical object from another client that is near the first client (e.g., in the same geographical area, in the same local area network, etc.). This may allow the first client to receive the graphical object faster than receiving it from the service and may allow the client to render or display the desktop environment more quickly. This also allows the client to use less bandwidth over a particular network when the client receives the graphical object. For example, the client may connect to the VM using a cellular network (e.g., an LTE network) or a business network that charges money for communicating data (e.g., for using bandwidth). Because the client may be connected to other clients via a separate network (e.g., a LAN), the client may receive the graphical objects from the other clients via the separate network (e.g., the LAN), rather than using the bandwidth of the cellular network or business work to receive the graphical objects from the VM.

Figure 1:
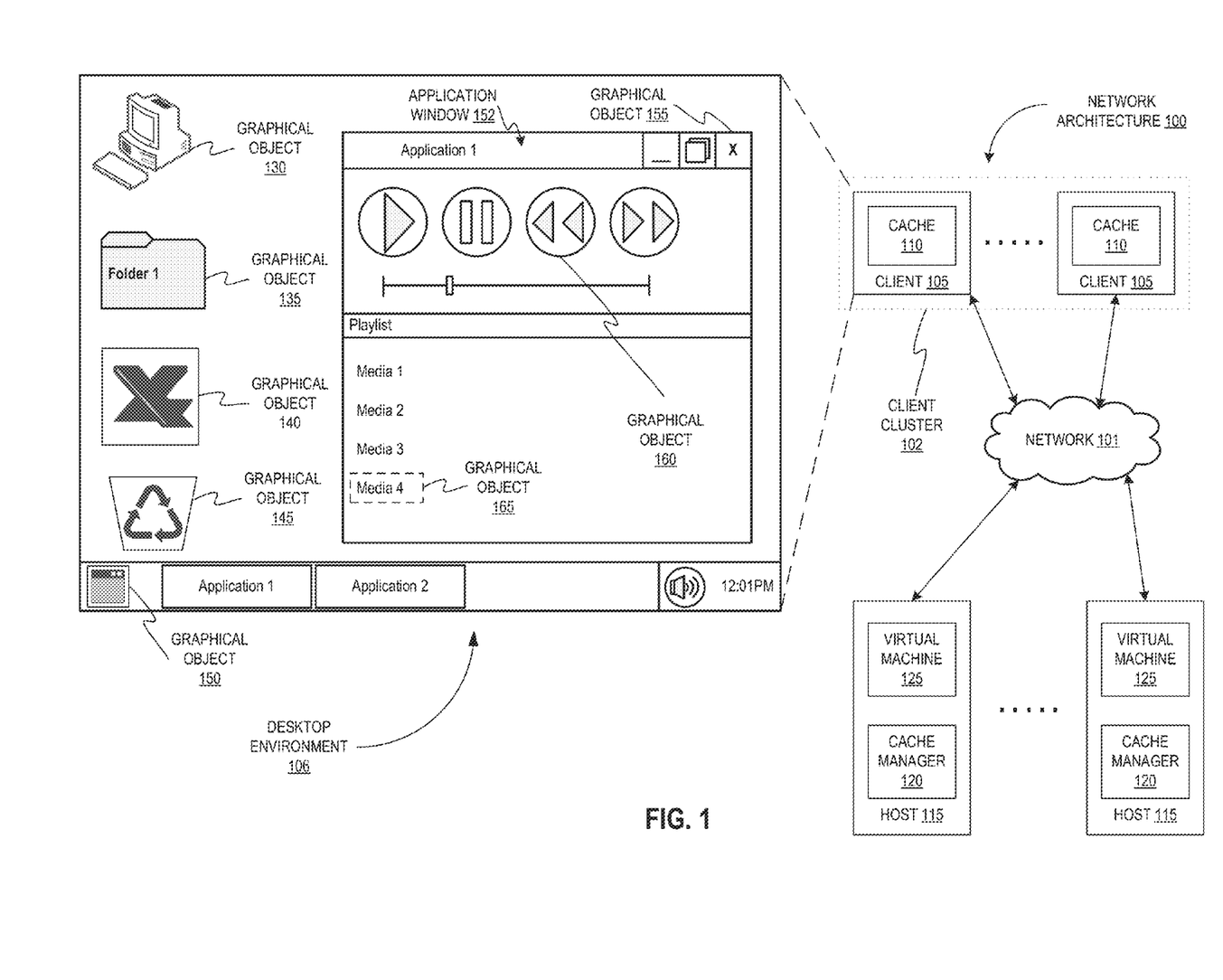
FIG. 1 is a block diagram illustrating an example network architecture, according to one embodiment.

FIG. 1 is a block diagram illustrating an example network architecture 100, according to one embodiment. The network architecture 100 includes a client cluster 102 coupled to hosts 115 over a network 101. The hosts 115 may be computing devices such as a personal computer (PC), a server computer, a laptop computer, a desktop computer, or any machine capable of executing a set of instructions (sequential or otherwise) that specify actions to be taken by that machine. The network 101 may be one or more of a private network (e.g., a local area network (LAN), a wide area network (WAN), intranet, etc.), a wireless network (e.g., a Wi-Fi network, such as an 802.11n network), a cellular network (e.g., a Long Term Evolution (LTE) network), and/or a public network (e.g., the Internet).

The client cluster 102 includes clients 105. The clients 105 may also be computing devices such as a desktop computer, a laptop computer, a tablet computer, a smart phone, etc. In one embodiment, the clients 105 in the client cluster 102 may be client devices that are geographical close to each other (e.g., are located within the same geographical area). For example, the clients 105 in the client cluster 102 may be client devices that are located in the same city, same postal ZIP code, same building, same corporate facility, etc. In another embodiment, the clients 105 may be client devices that use the same network (e.g., the same LAN, the same Wi-Fi network, etc.) to communicate with the hosts 115. In a further embodiment, the clients 105 in the client cluster 102 may be client devices that use the same service provider to communicate with the host 115. For example, the clients 105 may all use the same cable internet service provider or same cellular service provider to communicate data with the one or more of the hosts 115. In one embodiment, each client 105 in the client cluster 102 may be authenticated by a service on the host 115 before the client 105 is allowed to join (e.g., included in) the cluster 102. For example, the service on the host 115 may request credentials (e.g., a username and/or a password) from the client 105 and may verify that the credentials are valid. This authentication may prevent unauthorized clients from accessing the graphical objects that may be in the caches 110 of the clients 105.

Each host 115 may host a VM 125. Each host 115 may include a hypervisor (as discussed further below in conjunction with FIG. 2) that emulates the underlying hardware platform for the VM 125. The hypervisor may also be known as a virtual machine monitor (VMM) or a kernel-based hypervisor. The VM 125 may generate desktop image data (e.g., graphical objects 130 through 165, colors, graphics, images, icons, text, fonts, background images, background colors, and/or any other data used to display the desktop environment 106) and may provide the desktop image data to the hypervisor via a virtual graphics adapter (not shown in the figures). The hypervisor may provide the desktop image data to the client 105 and the client 105 may display (e.g., render) the desktop environment 106 using the desktop image data. When the desktop image data is provided (e.g., transmitted) to the client 105, client 105 may store the graphical objects used by the desktop image data (e.g., graphical objects 130 through 165) in a cache 110. The cache 110 may be a memory (e.g., random access memory), a cache, a drive (e.g., a hard drive), a flash drive, or another type of component or device capable of storing data.

In one embodiment, a VM 125 may be a software implementation of a physical machine. A VM 125 may allow a user to use the VM 125 as if the VM 125 was a physical machine. For example, the user may use a word processing program on the VM 125, access a website (e.g., browse the web) on the VM 125, view a media file (e.g., view a digital movie) on the VM 125, etc. As illustrated in FIG. 1, the client 105 may display a desktop environment 106. For example, the desktop environment 106 may be displayed to the user via a touch screen or a liquid crystal display (LCD) that is coupled to the client 105. The desktop environment 106 may be a graphical user interface that allows a user to access and/or use the VM 125. Client 105 may access VM 125 using a remote access protocol, such as VNC, RDP, Independent Computing Architecture (ICA), SPICE, etc. The remote access protocol provides client access to a remote machine display and devices (e.g., keyboard, mouse, audio) to allow the user to experience a similar interaction as with a local machine (e.g., may provide or display desktop environment 106 to a user).

The desktop environment 106 includes graphical objects 130, 135, 140, 145, 150, 155, 160, and 165. Graphical object 130 may be an icon that allows a user to access one or more drives on the VM 125. Graphical object 135 may be an icon that allows a user to access a folder (e.g., a directory) on the VM 125. Graphical object 140 may be an icon that allows a user to access an application (e.g., a spreadsheet application) on the VM 125. Graphical object 145 may be an icon that allows a user to delete files and/or folders on the VM 125. Graphical object 150 may be an image or icon that allows a user to access a list of programs and/or applications installed on the VM 125. Graphical object 155 may be an image or icon that may be used by a user to close the application window 152 (e.g., the window for "Application 1"). Application window 152 may be a user interface that allows a user to control a media player application (e.g., to control Application 1). Graphical object 160 may be an image or icon that is part of the application window 152 (e.g., the graphical object 160 may be the "rewind" button used to rewind playback of a media file). The graphical object 165 is text that is used in a list of media files that a user may access using the media player application (e.g., Application 1).

Each host 115 may also include a cache manager 120. As a host 115 generates and/or provides desktop image data (e.g., graphical objects, icons, images, etc.) to a client 105, the cache manager 120 may generate or obtain an identifier for each graphical object (e.g., an object identifier). The cache manager 120 may also obtain an identifier for the client 105 (e.g., a device identifier). The cache manager 120 may associate the object identifier (e.g., identifier for graphical object 130) with the device identifier (e.g., identifier for client 105) in a cache list. For example, the cache manger 120 may add an entry to the cache list and the entry may include the object identifier and the device identifier in the entry. This may allow the cache manager 120 to manage and/or track which graphical objects the cache manager 120 has provided to which clients 105. The different cache managers 120 may also communicate with each other and may receive or obtain cache lists from each other. This may allow each cache manager 120 to manage and/or track which graphical objects other cache managers 120 have provided to other clients 105. A cache list may be data (e.g., a table, a list, a tree, database records or tables, etc.) that indicates associations between object identifiers (e.g., identifiers for graphical objects) and device identifiers (e.g., identifiers for client devices, such as clients 105). In one embodiment, a cache manager 120 may use its own cache list and/or cache lists from other cache managers 120 when providing desktop image data to a client 105. The cache manager 120 may provide desktop image data to the a first client 105 and may also send data indicating that a graphical image object used in the desktop image data is stored on a second client 105. For example, the cache manager 120 may send the desktop image data, an identifier for the graphical image object used in the desktop image, and an identifier for the second client 105. The first client 105 may request the graphical image object from the second client 105 (e.g., by sending a request including the object identifier). The second client 105 may send the graphical image object (stored in its cache 110) to the first client 105 and the first client 105 may use the graphical image object and the desktop image data to display the desktop environment 106. In another example, the cache manager 120 may send desktop image data and an object identifier for a graphical image object used by the desktop image data to a client 105. The client 105 may already have the graphical image object in its cache 110 and may retrieve the graphical image object from its cache 110 using the object identifier.

Figure 2:
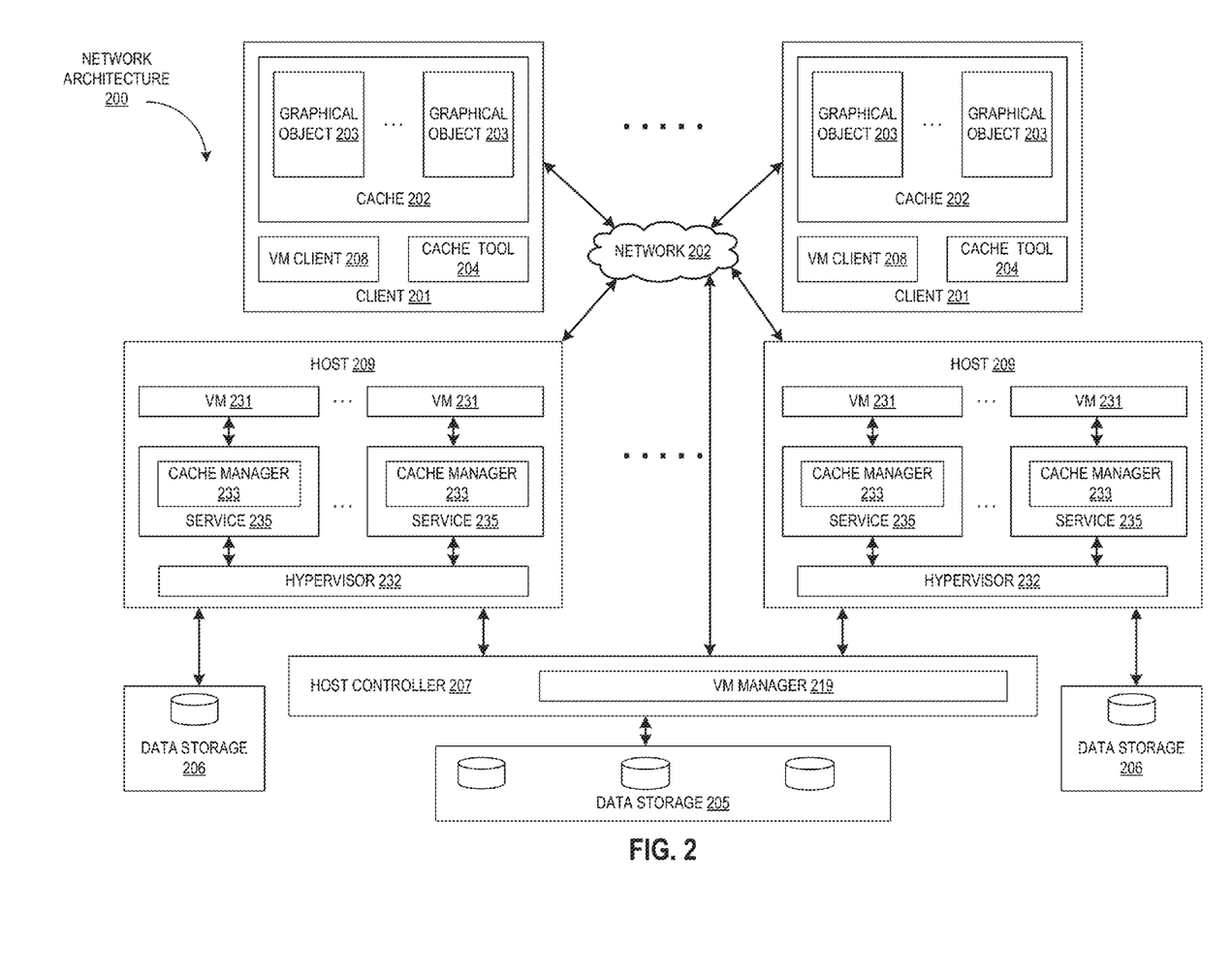
FIG. 2 is a block diagram illustrating another example network architecture, according to another embodiment.

In one embodiment, the cache manager 120 may obtain the statuses of one or more clients 105 and/or may obtain the statuses of one or more services (e.g., services 235 as discussed further below in conjunction with FIG. 2) that execute (e.g., operate) the VMs 125 on the hosts 115. For example, the cache manager 120 may periodically determine whether a client 105 is still operating (e.g., whether the client 105 is still communicating with the network 101, still maintaining its cache 110, and/or still executing). In another example, the cache manager 120 may periodically determine whether a service for a VM 125 is still operating (e.g., is still executing) on another host 115. Based on the statuses of the one or more client 105 and/or the one or more services, the cache manager 120 may update the entries in one or more cache lists. For example, if a first client 105 is no longer operating, then other clients 105 may not be able to access the cache 110 of the first client 105 and/or request graphical objects from the first client 105. The cache manager 120 may remove entries that include the identifier for the first client 105 from one or more cache lists. In another example, if a service that executes, manages, and/or operates a VM 125 (e.g., service 235 as illustrated in FIG. 2) is no longer operating, then the VM 125 may also have ceased operating. The client 105 that was using the VM 125 may no longer store graphical objects in its cache 110 because the client 105 is no longer using the VM 125 and is no longer displaying or providing a desktop environment to the user. The cache manager 120 may remove entries that include an identifier for the service from the cache list. In one embodiment, each host 115 may periodically determine whether each of the clients 105 and/or services is still operating. For example, the host 115 may periodically check on the status of each of the clients 105 and/or services. In another example, each client 105 and/or service may periodically send message, data, or other indicator to each host 115 to indicate that the client 105 and/or service is still operating. In a further example, a central computing device (e.g., host controller 207 as discussed below in conjunction with FIG. 2) may periodically poll each client 105 and/or service to determine whether the clients 105 and/or services are still operating.

As discussed above, the clients 105 are part of a client cluster 102 and the clients 105 may use the same network (e.g., same LAN), may be located in the same geographic area (e.g., in the same building, in the same city, etc.), and/or may use the same network service provider. This may allow the clients 105 to communicate data with each other more quickly. For example, this may allow clients 105 to send graphical objects to each other more quickly. This may also allow clients to obtain graphical objects from each other faster than obtaining graphical objects from one or more of the hosts 115. For example, because the access to a host 115 may go through one or more networks, servers, routers, switches, etc., it may take longer for a client 105 to obtain a graphical image object (used in the desktop environment 106) from a host 115, than to obtain the same graphical image object from the cache 110 in another client 105. In one embodiment, the different caches 110 located in the different clients 105 of the client cluster 102 may form a distributed cache of graphical objects (e.g., a cache of graphical objects that is distributed among the different clients 105). The cache managers 120 may manage and/or track where different graphical objects are stored and may instruct a client 105 to request a graphical object from another client 105 in order to allow the client 105 to obtain the graphical object more quickly.

FIG. 2 illustrates an exemplary network architecture 200 in which embodiments of the present disclosure may operate. The network architecture 200 includes hosts 209 coupled to clients 201 over a network 202. The hosts 209 may be a personal computer (PC), a server computer, a laptop computer, or any machine capable of executing a set of instructions (sequential or otherwise) that specify actions to be taken by that machine. The network 202 may be one or more of a private network (e.g., a LAN, a WAN, intranet, etc.), a wireless network (e.g., a Wi-Fi network), a cellular network (e.g., an LTE network), and/or a public network (e.g., the Internet). The hosts 209 are also coupled to data storages 206. The data storages 206 may include one or more mass storage devices (e.g., disks, flash drives, etc.) to store data generated and/or used by the hosts 209.

Each host 209 may host one or more virtual machines 231. Each virtual machine 231 includes a guest operating system that may be different from one virtual machine to another. The guest OS may include Microsoft Windows®, Linux®, Solaris®, Mac® OS, Fedora, etc. Each host 209 may include a hypervisor 232 that emulates the underlying hardware platform for the virtual machines 231. The hypervisor 232 may also be known as a virtual machine monitor (VMM) or a kernel-based hypervisor. In some embodiments, the hypervisor 232 may be part of a host operating system.

The hypervisor 232 may use services 235 to control, operate, and/or execute the virtual machines 231. Each service 235 may be a process, an application, a thread, a daemon, a script, etc. In one embodiment, each service 235 may control, operate, and/or execute a single virtual machine 231. In another embodiment, a service 235 may control, operate, and/or execute multiple virtual machines 231. In one embodiment, the services 235 may be part of the hypervisor 232. As discussed above, the VM 231 may be a software implementation of a physical machine. A user may use the VM 231 as if the VM 231 was a physical machine. The service 235 may process requests from the client 201 when a user accesses the VM 231 using the client 201 and may communicate data between the client 201 and the VM 231. In one embodiment, the VM 231 may generate desktop image data (e.g., data that may be used by a client 201 to display a desktop environment) and/or one or more graphical objects and may provide the desktop image data and/or the graphical objects to the service 235. The service 235 may receive the desktop image data and/or graphical objects and may provide the desktop image data and/or graphical objects to the client 201. The client 201 may display (e.g., render) a desktop environment (e.g., desktop environment 106 illustrated in FIG. 1) using the desktop image data. As discussed above, the desktop image data may use graphical objects (e.g., icons, images, text, fonts, background colors, background images, symbols, etc.). The VM 231 may generate these graphical objects and may provide these graphical objects to the client 201 when the client 201 accesses the VM 231. In one embodiment, each service 235 may be considered a "server" that hosts (e.g., operates or executes) a VM 231.

Each service 235 includes a cache manager 233. The cache manager 233 may track and/or manage the graphical objects that are provided to one or more clients 201 by service 235. The cache manager 233 may obtain an object identifier for the graphical object and may use the object identifier to manage the graphical objects that are provided to one or more client 201. In one embodiment, object identifier may be a hash of the graphical object. For example, the object identifier may be the hash value that is obtained by applying a hashing function or algorithm to the graphical objects. The cache manager 233 may use different hashing algorithms or functions including, but not limited to, the secure hash algorithms (SHA) (e.g., SHA-1, SHA-2, SHA-3), the message digest algorithms (e.g., MD-2 through MD-6), a hash-based message authentication code (HMAC), a cyclic redundancy check (CRC), cryptographic hashing algorithms, and/or non-cryptographic hashing algorithms. In one embodiment, the cache manager 233 may generate object identifiers using various other methods and/or algorithms provided that the object identifier that is generated is unique across the different cache managers 233 and the same object identifier is generated when the method/algorithm is applied to the same graphical object.

The cache manager 233 may also obtain a device identifier for the client 201 (e.g., an internet protocol (IP) address, a medium access control (MAC) address, an alphanumeric sequence, a string, a number, etc.). The cache manager 233 may include the object identifier and the device identifier in a cache list and may associate the object identifier with the device identifier (e.g., add the object identifier and device identifier into an entry in a table). The cache manager 233 may also obtain a service identifier for the service 235 that is executing and/or operating the VM 231 used by the client 201. The service identifier may also be a string, a number, an alphanumeric value, etc. In one embodiment, the cache manager 233 may receive service identifiers from the VM manager 219 via a management agent or service (not shown in the figures) that is executing on the host 209.

In one embodiment, when the VM 231 generates a graphical object, the cache manager 233 may determine whether the graphical object has already been provided to the client 201. For example, the cache manager 233 may generate an object identifier for the graphical object (e.g., a hash of the graphical object). If the object identifier is in the cache list for the cache manager 233 and the cache list indicates that the client 201 has the graphical object, the service 235 may instruct a client 201 to access the graphical object from its own cache 202. In another embodiment, when the VM 231 generates a graphical object for a first client 201, the service 235 may use the cache manager 233 to determine whether the graphical object is stored in a second cache 202 of a second client 201. For example, the cache manager 233 may determine that the object identifier for a graphical object is associated with a client identifier for the second client 201. The service 235 may provide the first client 201 with the object identifier and the client identifier for the second client 201. The first client 201 may then access the second client 201 (using the device identifier) and may request the graphical object from the second client 201 (using the object identifier). In a further embodiment, the cache manager 233 may determine that none of the clients 201 have the graphical object in their cache. For example, the cache manager 233 may determine that the object identifier for a graphical object does not exist in the cache list or in any cache list. The VM 231 may generate the graphical object and the service 235 may provide the graphical object to the client 201. The cache manager 233 may obtain the object identifier for the graphical object and an identifier for the client 201 and may associate the object identifier with the device identifier, in the cache list.

The clients 201 may include computing devices that have a wide range of processing capabilities such as PCs, PDAs, smart phones, laptop computers, etc. As discussed above (in conjunction with FIG. 1), the clients 201 may be part of a client cluster. The clients 201 may use the same network (e.g., same LAN), may be located in the same geographic area (e.g., in the same building, in the same city, etc.), and/or may use the same network service provider. The clients 201 may each be authenticated by one of the services 235 before the clients 201 are included in the client cluster. For example, the service 235 may validate credentials (e.g., username and/or password) provided by the client 201 before the client 201 is added or included in the client cluster. The clients 201 may access the virtual machines 231 over the network 202. In one scenario, each virtual machine 231 provides a virtual computing device for a client 201. From a user's point of view, the virtual computing device functions as a physical computing device (e.g., a personal computer) and is indistinguishable from a physical virtual computing device. Each client 201 includes a cache 202, a VM client 208, and a cache tool 204. The cache 202 may be a memory (e.g., random access memory), a cache, a drive (e.g., a hard drive), a flash drive, or another type of component or device capable of storing data. The cache 202 may store graphical objects 103 that may be used to display a desktop environment (e.g., desktop environment 106 illustrated in FIG. 1) to a user when the user accesses a virtual machine 231.

As discussed above, a client 201 may access a VM 231 and may allow a user to use the VM 231 as if the VM 231 were a physical computing device. The VM client 208 may provide, render, and/or display a desktop environment (e.g., desktop environment 106 illustrated in FIG. 1) that allows a user to use the VM 231. The VM client 208 may receive desktop image data (e.g., images, graphics, text, icons, and/or other data that may be used to display the desktop environment) from a host 209 (e.g., from service 235 on the host 209). The desktop image data may include and/or use one or more graphical objects (e.g., graphical objects 203). The VM client 208 may render, display, draw, and/or provide the desktop environment to the user based on or using the desktop image data.

The cache tool 204 may manage the cache 202 and the graphical objects 203 for the client 201. In one embodiment, when the VM client 208 receives a new graphical object 203 (e.g., a graphical object 203 that is not in already the cache 202), the cache tool 204 may store the graphical object 203 in the cache 202. The cache tool 204 may receive object identifiers for the graphical objects from the service 235 and may also store the object identifiers in the cache 202. In another embodiment, the cache tool 204 may receive requests for graphical objects from other clients 201. The requests may include an object identifier (e.g., a hash) for the requested graphical objects. The cache tool 204 may check the cache 202 to determine if the object identifier is stored within the cache 202. If the object identifier is stored within the cache 202, the cache tool 204 may obtain the graphical object 103 associated with the object identifier and may provide the graphical object 103 to the one or more other clients 201.

The hosts 209 may be managed by a host controller 207. The host controller 207 may be a computer coupled to the hosts 209 directly or via the network 202. The host controller 207 may also be in communication with the clients 201, via the network 202. Alternatively, the host controller 207 may be part of one of the hosts 209. In one embodiment, the host controller may include a VM manager 219. The VM manager 219 may monitor, manage, add, remove, configure and/or modify the VMs 231 and/or the hosts 209. For example, VM manager 219 may add a new VM, remove an existing VM, change or reconfigure a VM (e.g., add/remove/replace virtual hardware), power on/off the hosts 209, provide directory service to the virtual machines 231, and perform other managerial functions. The host controller 207 may also have access to the data storage 105 to store and/or retrieve data. The data storage 205 may include one or more mass storage devices (e.g., disks, flash drives, etc.). In one embodiment, the VM manger 219 may remove or shut down a VM 231 by shutting down the service 235 that executes and/or operates the VM 231. The VM manager 219 may shut down a VM 231 based on a user request (e.g., based on a request received from a client 201 or from a system administrator using the host controller 207).

Figure 3:
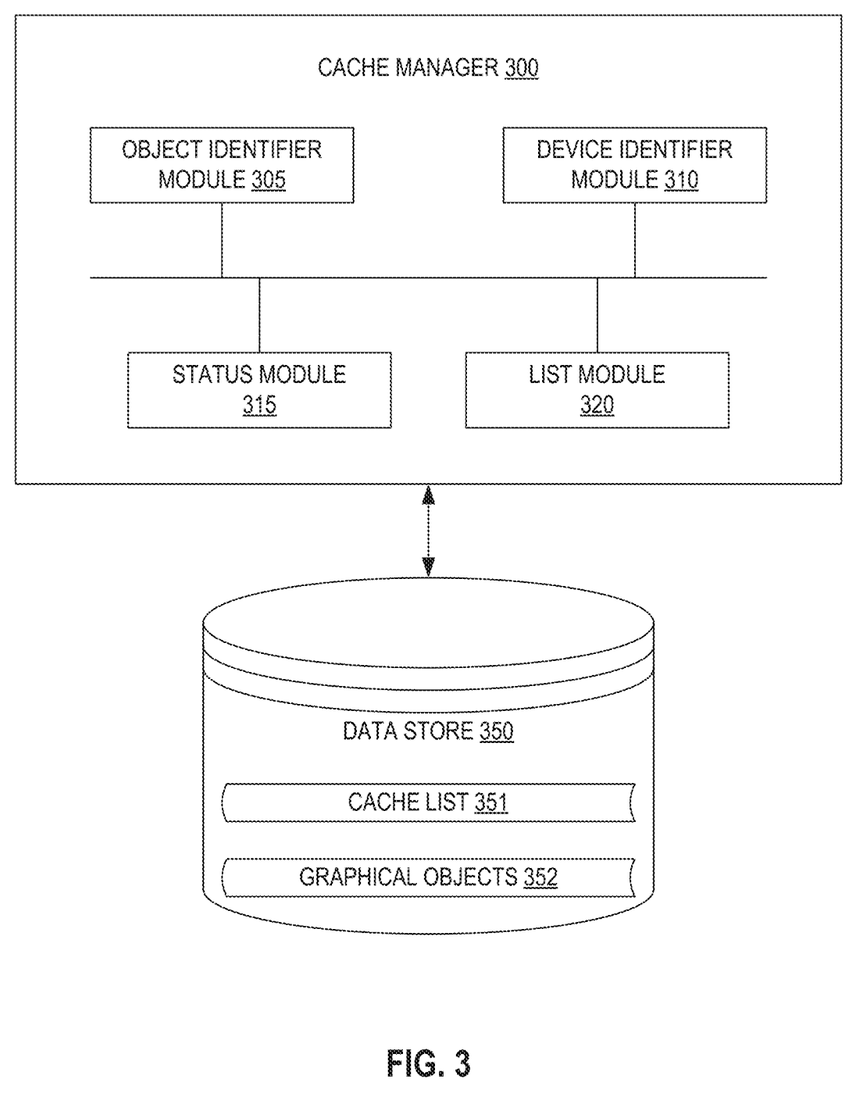
FIG. 3 is a block diagram illustrating a cache manager, according to one embodiment.

FIG. 3 is a block diagram illustrating a cache manager 300, according to one embodiment. The cache manager 300 includes an object identifier module 305, a device identifier module 310, a status module 315, and a list module 320. More or less components may be included in the cache manager 300 without loss of generality. For example, two of the modules may be combined into a single module, or one of the modules may be divided into two or more modules. In one embodiment, one or more of the modules may reside on different computing devices (e.g., different desktop computers or laptop computers). In one embodiment, the cache manager 300 may be part of a service that is executing on a host (e.g., part of service 235 as illustrated in FIG. 2).

The cache manager 300 is communicatively coupled to a data store 350. The data store 350 may be a memory (e.g., random access memory), a cache, a drive (e.g., a hard drive), a flash drive, or another type of component or device capable of storing data. The data store 350 includes a cache list 351 and graphical objects 352. The graphical objects 352 may be images, icons, text, graphics, etc. that may be used to display a desktop environment to a user. In one embodiment, the graphical objects 352 may not be stored in the data store 350 in order to reduce the amount of storage space used by the data store 350. The cache list 351 may be data indicative of associations between device identifiers and object identifiers. In one embodiment, the cache manager 300 may obtain other cache lists from other cache managers and may add/include the associations in the other cache lists within the cache list 351. In another embodiment, the data store 350 may store multiple cache lists, one cache list for each service on one or more hosts (such as services 235 on hosts 209, as shown in FIG. 2). Although the data store 350 is illustrated in FIG. 3 as being separate from the cache manger 300, in one embodiment, the data store 350 may be part of or included in the cache manager 300.

Table 1 below illustrates an example of cache list 351, according to one embodiment. Table 1 includes three columns, an object identifier column, a device identifier column, and a service identifier column. Each row of Table 1 may be an entry in the cache list 351. The first row indicates that the object identifier "L83SD8543K" for a graphical object is associated with the device identifier 10.2.3.22:55 (e.g., the client device having an IP address of 10.2.3.22 and a transmission control protocol (TCP) or a user datagram protocol (UDP) port 55). Another client device may access the device by accessing port 55 of the IP address 10.2.3.22. The first row also indicates that the graphical object with the object identifier "L83SD8543K" is stored in the cache of the client device having an IP address 10.2.3.22 and a TCP or UDP port 55. The object identifier "L83SD8543K" and the device identifier "10.2.3.22:55" are also associated with a service identifier vm_service_1. The service identifier may be an identifier for the service (e.g., a process, thread, daemon, such as service 235 illustrated in FIG. 2) that is controlling, executing, and/or operating a VM that is used by the client with the device identifier 10.2.3.22:55. Although TCP/UDP addresses and ports are illustrated in Table 1, it should be understood that in other embodiments, the device identifier may include any data or information that allows another client device to access the client device associated with the device identifier. For example, the device identifier may be a uniform resource locator (URL).

TABLE 1

| Object Identifier | Device Identifier | Service Identifier |
| --- | --- | --- |
| L83SD8543K | 10.2.3.22:55 | vm_service_1 |
| EHE903JKSA | 10.2.3.52:423 | vm_service_2 |
| JD935FD13K | 10.2.3.52:423 | vm_service_2 |
| ... | ... | ... |
| KSO564DEF1 | 15.56.155.30:1003 | vm_service_23 |

In one embodiment, the object identifier 305 may create or generate object identifiers for the graphical objects 352. For example, the object identifier module 305 may generate a hash using a graphical object 352. The object identifier module 305 may receive the graphical objects from the service (e.g., service 235 as illustrated in FIG. 2). As discussed above, the object identifier module 305 may use different algorithms or functions (e.g., hashing algorithms or functions) to generate the object identifiers. The object identifiers may be unique across the different cache managers and the object identifier module 305 may generate the same object identifier when the method/algorithm is applied to the same graphical object.

In one embodiment, the device identifier module 310 may obtain a device identifier for a client that receives the graphical objects from the service. The device identifier may be an IP address, a MAC address, an alphanumeric sequence, a string, a number, and/or any other value that may be used to identify a particular client (e.g., a client device). The device identifier module 310 may also generate an identifier for the client. For example, the device identifier module 310 may generate an alphanumeric string as an identifier for the client. In another example, the device identifier module 310 may use a device name (e.g., a name assigned by the user of the device, such as "MY_PC1") as the identifier for the client. In a further example, the device identifier module 310 may use a hash of another value (e.g., a hash of the client's MAC address) to generate the identifier for the client.

In one embodiment, the status module 315 may determine the statuses of one or more clients and may also determine the statuses of one or more services that execute and/or operate VMs (e.g., services 235 as illustrated in FIG. 2). The status module 315 may periodically communicate with the one or more clients and/or one or more services. For example, the status module 315 may poll a client every hour to determine of the client is still operating. The status module 315 may use the cache list 351 when determining the status of clients and/or services. For example, the status module 315 may periodically poll each client included in the cache list 351 and/or may periodically poll each service listed in the cache list 351. The status module 315 may also receive messages and/or data from one or more clients and/or one or more services that may indicate the statues of the clients and/or services. For example, a service or a client may periodically send messages to the status module 315 to indicate that the service or client is still operating. In a further example, when a service or a client is shut down or closed, the service or client may send a message and/or data to the status module 315 to indicate that the service or client will no longer be operating. The status module 315 may update the cache list 351 based on the status of the clients and/or services. For example, if a client is no longer operating, the status module 315 may remove all entries that include an identifier for the client, from the cache list 351.

In one embodiment, the list module 320 may access the cache list 351 and may provide object identifiers and/or client identifiers to clients. The list module 320 may determine whether an object identifier for a graphical object exists in the cache list 351 when a host transmits desktop image data that uses the graphical object to a client. If the object identifier exists, the list module 320 may obtain the device identifier that is associated with the object identifier. The cache manager 300 may provide the device identifier and/or the object identifier to the client along with the desktop image data. In one embodiment, if the client identifier is for the client that is receiving the desktop image data (e.g., the identifier is for the same client that is displaying a desktop environment using the desktop image data) the cache manager 300 may not send the device identifier because cache list 351 indicates that the client itself already has the graphical object in its cache. In another embodiment, if the device identifier is for a client that is different from the client receiving the desktop image data (e.g., is an identifier for another client) the cache manager 300 may send both the device identifier and the object identifier to the client. If the list module 320 determines that the object identifier does not exist in the cache list (e.g., determines that there are no clients that have this graphical object in their cache), the cache manager 300 may request and/or receive the graphical object from a VM and may send the graphical object to the client. The list module 320 may obtain an object identifier for the graphical object (e.g., from the object identifier module 305), a service identifier for a service that executes and/or operates a VM used by the client, and may obtain a device identifier for the client (e.g., from the device identifier module 310). The list module 320 may associate the object identifier, the service identifier, and the device identifier with each other (e.g., add an entry that includes the object identifier, the service identifier, and the device identifier into the cache list 351).

Figure 4:
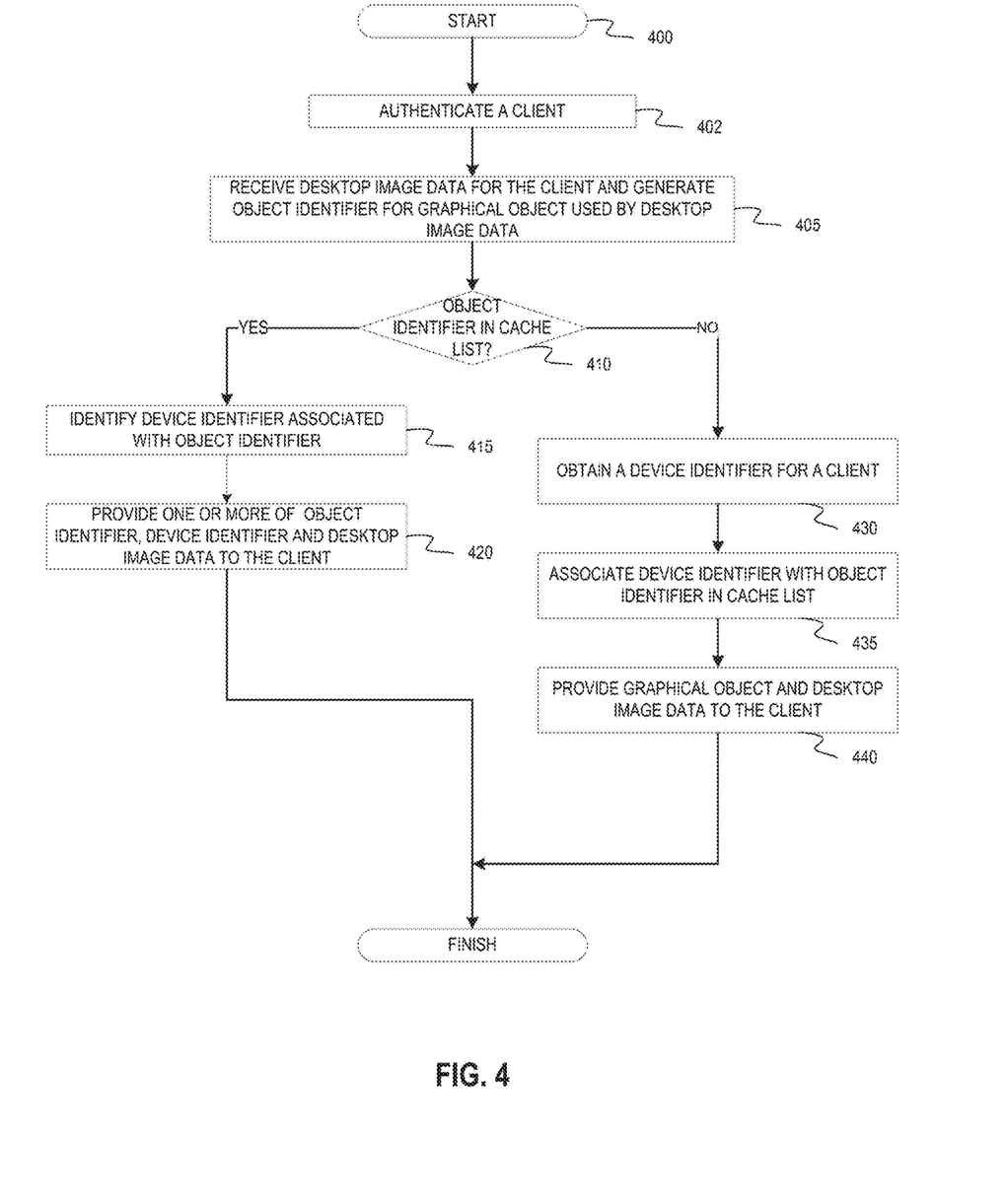
FIG. 4 is a flow diagram illustrating a method of managing a distributed cache, according to one embodiment.
Figure 5:
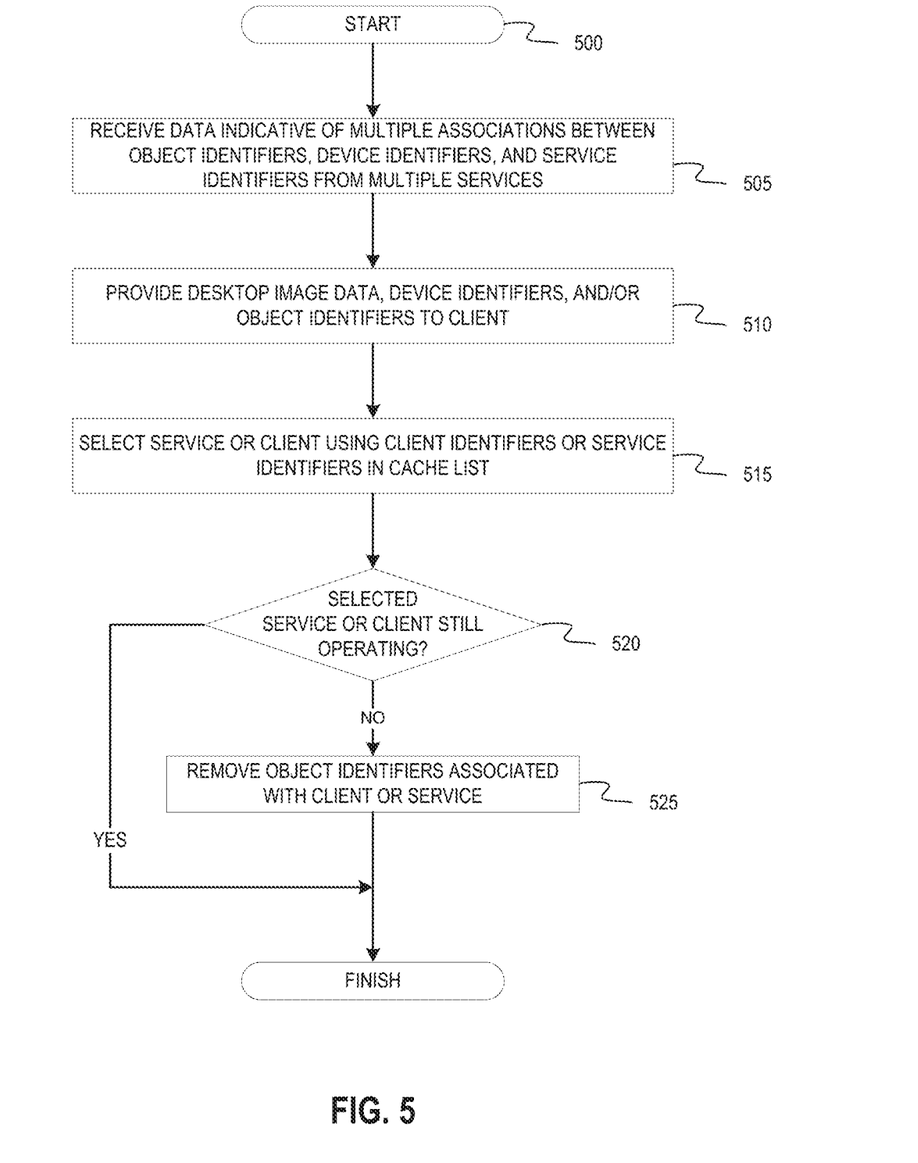
FIG. 5 is a flow diagram illustrating a method of managing a distributed cache, according to another embodiment.

FIGS. 4-5 are flow diagrams illustrating methods for managing a distributed cache. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating a method of managing a distributed cache, according to another embodiment. The method 400 may be performed by processing logic that comprises hardware (e.g., circuitry, dedicated logic, programmable logic, microcode, etc.), software (e.g., instructions run on a processor to perform hardware simulation), or a combination thereof. In one embodiment, method 400 may be performed by a service and/or a cache manager, as shown in FIGS. 2 and 3.

Referring to FIG. 4, the method 400 begins at block 402 where the method 400 authenticates a client. The client may be authenticated before the client is included in a client cluster (as illustrated in FIG. 1). This may prevent unauthorized clients for accessing caches for other clients in the client cluster. At block 405, the method 400 receives desktop image data for a client and generates an object identifier for a graphical object (e.g., an icon, an image, text, etc.) used by the desktop image data. For example, the method 400 may receive desktop image data and/or one or more graphical objects generated by a VM on a host. As discussed above, the desktop image data and the graphical objects may be used by the client to display a desktop environment. At block 410, the method 400 determines whether the object identifier is in a cache list. If the object identifier is in the cache list, the method 400 proceeds to block 415, where the method 400 identifies a device identifier associated with the object identifier. The method 420 provides one or more of the object identifier, the device identifier and the desktop image data to the client. In one embodiment, the method 400 may not provide the device identifier at block 420 if the device identifier is an identifier for the client itself because this may indicate the client itself has the graphical object stored in its cache. In another embodiment, the method 400 may provide the device identifier at block 420 if the device identifier is for another client (e.g., a different client) because the client may use the device identifier to access the other client. After block 420, the method 400 ends.

Referring back to block 410, if the object identifier is not in the cache list, the method 400 moves to block 430, where the method 400 obtains the device identifier for the client at block 430 (e.g., obtains the IP address, a MAC address, an alphanumeric value, etc., used to identify the client). The method 400 associates the device identifier with the object identifier in the cache list. For example, the method 400 may add an entry in the cache list and the entry may include the object identifier and the device identifier. As discussed above, the method 400 may also include a service identifier (e.g., an identifier for a service that executes and/or operates a VM used by the client) in the entry. At block 435 the method 400 associates the device identifier with the object identifier in the cache list. The method 400 then provides the object and the image data to the client (block 440). After block 440, the method 400 ends.

FIG. 5 is a flow diagram illustrating a method of managing a distributed cache, according to one embodiment. The method 500 may be performed by processing logic that comprises hardware (e.g., circuitry, dedicated logic, programmable logic, microcode, etc.), software (e.g., instructions run on a processor to perform hardware simulation), or a combination thereof. In one embodiment, method 500 may be performed by a service and/or a cache manager, as shown in FIGS. 2 and 3.

Referring to FIG. 5, the method 500 begins at block 505 where the method 500 receives data indicative of multiple associations between object identifiers, device identifiers, and service identifiers. The data indicative of the multiple associations may be received from multiple services (e.g., services 235 illustrated in FIG. 2). For example, the method 500 may receive multiple cache lists from multiple services and may include the information from the multiple cache lists in a local cache list (e.g., a cache list stored on host). In one embodiment, the method 505 may periodically perform block 505. For example, the method 500 may periodically receive cache lists from different cache managers on different hosts (e.g., receive cache lists once every few seconds, once every minute, etc.). In another example, the method 500 may periodically request cache lists from different cache managers on different hosts. In a further example, each cache manager may send a message (e.g., a notification) and/or an updated cache list to other cache managers when the cache manager updates the cache list. At block 510, the method 500 provides desktop image data, device identifiers, and/or object identifiers to a client that is providing or displaying a desktop environment. In one embodiment, the method 500 may perform block 505 one or more times (e.g., receive cache lists from different cache managers one or more times) prior to proceeding to block 510 at a later time.

At block 515, the method 500 selects a service or a client using client identifiers or service identifiers in the cache list. For example, the method 500 may select a client by selecting the client identifier for the client. At block 520, the method 500 determines whether the selected service or client is still operating. If the selected service or client is still operating, the method 500 ends. The method 500 may determine whether the selected service or client is still operating by periodically polling the selected client or service. The method 500 may also determine whether a selected service or client is still operating when the client or service sends a message, data, or other information indicating that the service or client is shutting down (e.g., sends a message to a host controller or a host). If the selected service or client is not operating, the method 500 removes object identifiers that are associated with the identifier for the selected client or service (e.g., associated with the service identifier for the selected service or the device identifier for the selected client). In one embodiment, the method 500 may periodically perform blocks 515, 520, and 525 for each client and/or each service that is included in the cache list. After block 525, the method 500 ends.

Figure 6:
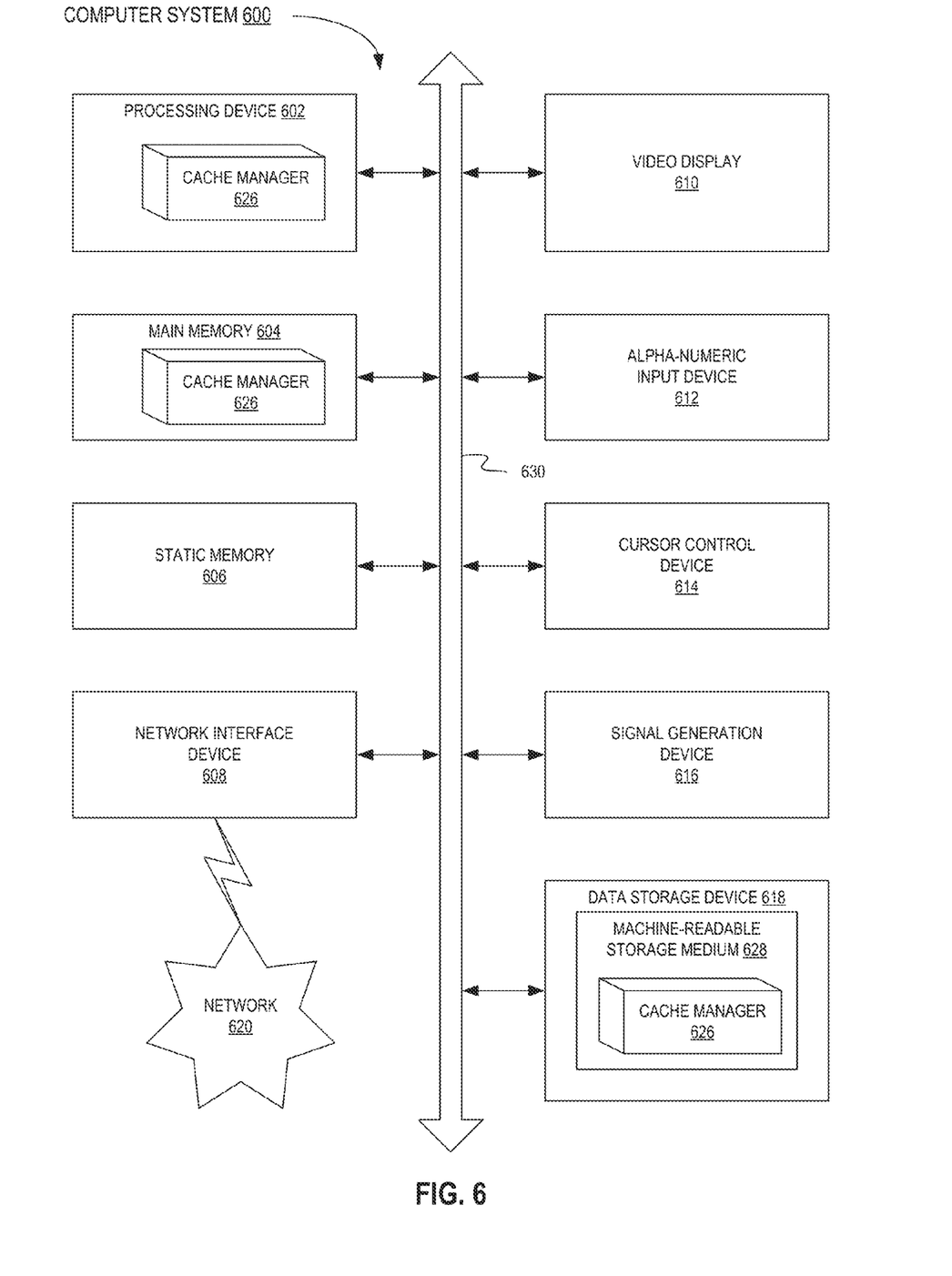
FIG. 6 is a block diagram of a machine in the example form of a computer system, in accordance with one embodiment.

FIG. 6 illustrates a diagrammatic representation of a machine in the example form of a computer system 600 within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute cache manager 626 for performing the operations and steps discussed herein.

The computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 618 may include a computer-readable medium 628 on which is stored one or more sets of instructions (e.g., instructions of the cache manager 626) embodying any one or more of the methodologies or functions described herein. The cache manager 626 may also reside, completely or at least partially, within the main memory 604 and/or within the processing device 602 during execution thereof by the computer system 600, the main memory 604 and the processing device 602 also constituting computer-readable media. The instructions may further be transmitted or received over a network 620 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "obtaining," "identifying," "providing," "storing," "receiving," "determining," "removing," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a processing device of a host, desktop image data for a first client device, wherein the desktop image data uses a graphical object;
    determining an object identifier of the graphical object;
    determining a device identifier of a second client device associated with the graphical object; and
    providing, by the processing device of the host, the object identifier and the device identifier to the first client device.

2. The method of claim 1, wherein determining the device identifier comprises:
    determining that the object identifier is in a cache list; and
    determining the device identifier associated with the object identifier in the cache list.

3. The method of claim 1, wherein the host hosts a virtual machine that generates the desktop image data for the first client device.

4. The method of claim 1, further comprising providing, by the processing device of the host, the desktop image data to the first client device.

5. The method of claim 1, wherein the processing device of the host does not provide the graphical object to the first client device.

6. The method of claim 1, wherein the first client device and the second client device are located on a same local area network (LAN), the first client device and the second client device are located in a same geographical area, or the first client device and the second client device use a same network service provider.

7. The method of claim 1, further comprising authenticating the first client device prior to providing the object identifier and the device identifier to the first client device.

8. A system comprising:
    a memory; and
    a processing device operatively coupled to the memory, the processing device to:
        receive desktop image data for a first client device, wherein the desktop image data uses a graphical object;
        determine an object identifier of the graphical object;
        determine a device identifier of a second client device associated with the graphical object; and
        provide the object identifier and the device identifier to the first client device.

9. The system of claim 8, wherein, to determine the device identifier, the processing device is to:
    determine that the object identifier is in a cache list; and
    determine the device identifier associated with the object identifier in the cache list.

10. The system of claim 8, wherein the processing device executes a host that hosts a virtual machine that generates the desktop image data for the first client device.

11. The system of claim 8, wherein the processing device is further to provide the desktop image data to the first client device.

12. The system of claim 8, wherein the processing device does not provide the graphical object to the first client device.

13. The system of claim 8, wherein the first client device and the second client device are located on a same local area network (LAN), the first client device and the second client device are located in a same geographical area, or the first client device and the second client device use a same network service provider.

14. The system of claim 8, wherein the processing device is further to authenticate the first client device prior to providing the object identifier and the device identifier to the first client device.

15. A non-transitory computer-readable medium having instructions encoded thereon wherein, when executed by a processing device, cause the processing device to:
   receive, by the processing device, desktop image data for a first client device, wherein the desktop image data uses a graphical object;
   determine an object identifier of the graphical object;
   determine a device identifier of a second client device associated with the graphical object; and
   provide, by the processing device, the object identifier and the device identifier to the first client device.

16. The non-transitory computer-readable medium of claim 15, wherein, to determine the device identifier, the processing device is to:
   determine that the object identifier is in a cache list; and
   determine the device identifier associated with the object identifier in the cache list.

17. The non-transitory computer-readable medium of claim 15, wherein the processing device executes a host that hosts a virtual machine that generates the desktop image data for the first client device.

18. The non-transitory computer-readable medium of claim 15, wherein the processing device is further to provide the desktop image data to the first client device.

19. The non-transitory computer-readable medium of claim 15, wherein the processing device does not provide the graphical object to the first client device.

20. The non-transitory computer-readable medium of claim 15, wherein the processing device is further to authenticate the first client device prior to providing the object identifier and the device identifier to the first client device.

* * * * *